United States Patent
Bockhold et al.

(10) Patent No.: US 7,631,214 B2
(45) Date of Patent: Dec. 8, 2009

(54) FAILOVER PROCESSING IN MULTI-TIER DISTRIBUTED DATA-HANDLING SYSTEMS

(75) Inventors: A. Joseph Bockhold, Rochester, MN (US); William Thomas Newport, Rochester, MN (US); Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 11/755,861

(22) Filed: May 31, 2007

(65) Prior Publication Data

US 2008/0301199 A1 Dec. 4, 2008

(51) Int. Cl.
*G06F 11/00* (2006.01)

(52) U.S. Cl. ............... 714/4; 714/6; 714/20; 711/147; 718/101

(58) Field of Classification Search .................. None
See application file for complete search history.

(56) References Cited

U.S. PATENT DOCUMENTS

| | | | | |
|---|---|---|---|---|
| 5,951,695 | A * | 9/1999 | Kolovson | 714/16 |
| 6,553,392 | B1 * | 4/2003 | Mosher et al. | 707/204 |
| 6,779,093 | B1 * | 8/2004 | Gupta | 711/162 |
| 6,990,606 | B2 * | 1/2006 | Schroiff et al. | 714/7 |
| 7,185,228 | B2 * | 2/2007 | Achiwa | 714/20 |
| 7,197,660 | B1 * | 3/2007 | Liu et al. | 714/4 |
| 7,203,796 | B1 * | 4/2007 | Muppalaneni et al. | 711/114 |
| 7,437,609 | B2 * | 10/2008 | Anderson et al. | 714/20 |
| 7,451,345 | B2 * | 11/2008 | Butterworth et al. | 714/6 |
| 7,475,281 | B2 * | 1/2009 | Varghese | 714/6 |
| 2003/0204683 | A1 * | 10/2003 | Okumoto et al. | 711/147 |
| 2004/0103342 | A1 * | 5/2004 | Moser et al. | 714/6 |
| 2004/0249869 | A1 * | 12/2004 | Oksanen | 707/204 |
| 2005/0138461 | A1 * | 6/2005 | Allen et al. | 714/4 |
| 2006/0190760 | A1 * | 8/2006 | Saika | 714/4 |
| 2007/0234106 | A1 * | 10/2007 | Lecrone et al. | 714/6 |
| 2008/0016387 | A1 * | 1/2008 | Bensinger | 714/4 |
| 2008/0172572 | A1 * | 7/2008 | Beardsley et al. | 714/6 |
| 2008/0215743 | A1 * | 9/2008 | Wahl | 709/230 |
| 2009/0006238 | A1 * | 1/2009 | Callaway et al. | 705/35 |
| 2009/0100289 | A1 * | 4/2009 | Chen et al. | 714/4 |
| 2009/0157766 | A1 * | 6/2009 | Shen et al. | 707/202 |

\* cited by examiner

*Primary Examiner*—Christopher S McCarthy
(74) *Attorney, Agent, or Firm*—Dillon & Yudell LLP (57) ABSTRACT

A method and system for processing a transaction request in a distributed data handling architecture. Responsive to receiving a transaction request at a master transaction server, a transaction identifier that identifies a data operation specified by the received transaction request is recorded within a local memory of a replica server. Data operation results are committed master transaction server memory and responsive to committing the data within the master transaction server memory, a post commit signal is sent to the replica server. Data operation results are also committed within local memory of the replica server, and responsive to a failover condition that prevents the master transaction server from sending the post commit signal, the recorded transaction identifier is utilized to synchronize data stored locally within the replica server with data stored within a persistent backend data store shared by the master transaction server and the replica server.

20 Claims, 6 Drawing Sheets

FIG. 1

(PRIOR ART)

FAILOVER PROCESSING IN MULTI-TIER DISTRIBUTED DATA-HANDLING SYSTEMS

BACKGROUND OF THE INVENTION

1. Technical Field

The present invention relates generally to preserving data integrity in response to server failure events, and in particular, to a system and method for ensuring data consistency following a master transaction server failover event. More particularly, the present invention relates to a system and method for providing data consistency among multiple stored instances of data maintained in the middleware layer of an n-tier data handling and storage architecture.

2. Description of the Related Art

Client-server is a network architecture that separates requester or master side (i.e. client side) functionality from a service or slave side (i.e. server side functionality). For many e-business and internet business applications, conventional two-tier client server architectures are increasingly being replaced by three-or more tier architectures in which transaction server middleware resides between client nodes and large scale backend data storage facilities. Exemplary of such multi-tier client-server system architectures requiring access to large scale backend data storage and highly reliable uninterrupted operability are so-called high availability (HA) systems.

In one aspect, HA is a system design protocol and associated implementation that ensures a desired level of operational continuity during a certain measurement period. In another aspect, the middleware architecture utilized in HA systems provides improved availability of services from the server side and more efficient access to centrally stored data. Namely, the scale of on-line business applications often requires hundreds or thousands of middleware transaction servers. In such a configuration, large-scale backend data storage presents a substantial throughput bottleneck. Moving most active data into middleware transaction server tiers is an effective way to reduce demand on the backend database and increases responsiveness and performance.

In one such distributed request handling system, an in-memory (i.e., within local memory of transaction server) database utilizes a transactional data grid of redundant or replica server and data instances for optimal scalability and performance. In this manner, transaction data retrieved and generated during processing of client requests is maintained in the distributed middle layers unless and until it must be copied back to the backing store in the backend storage.

Figure 1:
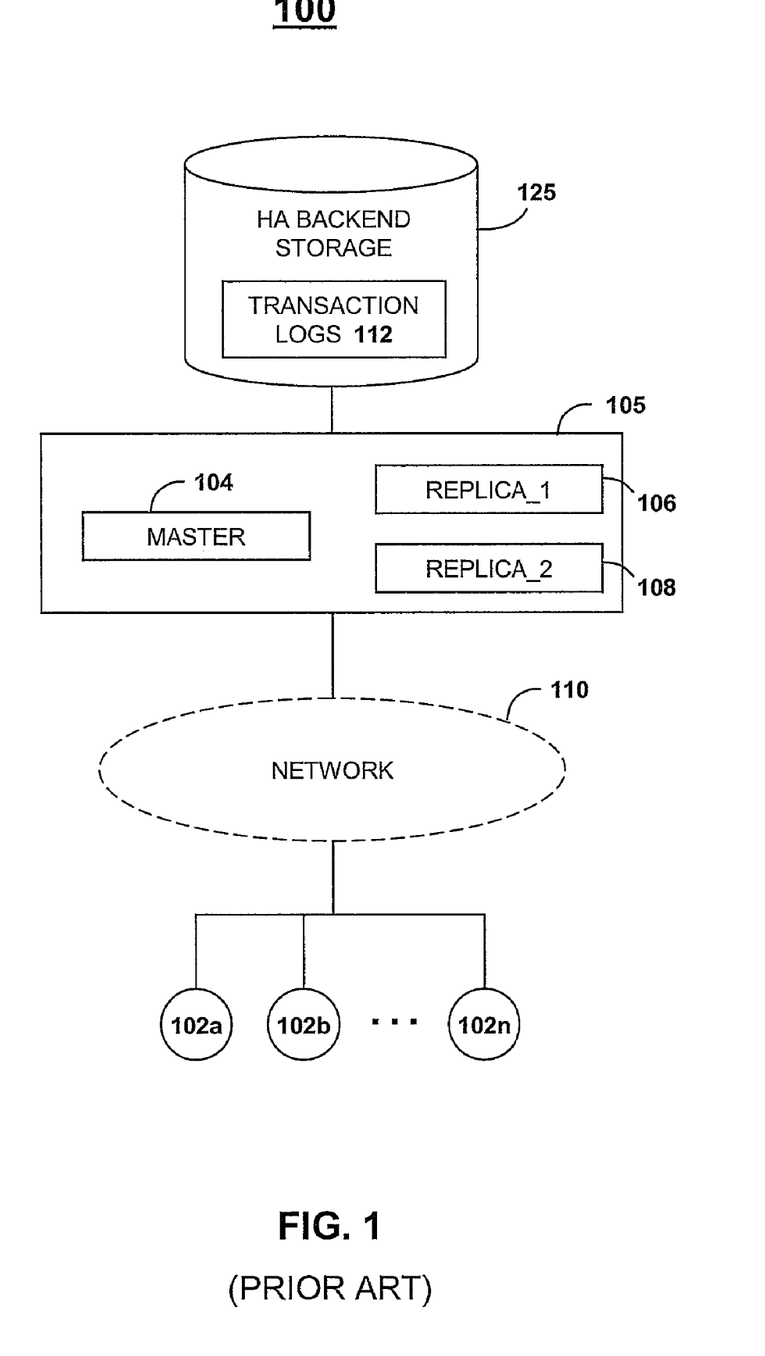
FIG. 1 is a high-level block diagram illustrating the general structure and data storage organization of a high availability system.

An exemplary distributed HA system architecture is illustrated in FIG. 1. Specifically, FIG. 1 illustrates an HA system 100 generally comprising multiple requesters or client nodes 102a-102n and a server cluster 105 are connected to a network 110. Requesters such as client nodes 102a-102n send service requests to server cluster 105 via the network 110. In accordance with well-known client-server architecture principles, requests from clients 102a-102n are handled by servers within server cluster 105 in a manner providing hardware and software redundancy. For example, in the depicted embodiment, server cluster 105 comprises a master transaction server 104 and servers 106 and 108 configured as replicas of master server 104. In such a configuration, data updates, such as data modify and write operations are typically processed by master transaction server 104 and copied to replica servers 106 and 108 to maintain data integrity.

Redundancy protection within HA system 100 is achieved by detecting node or daemon failures and reconfiguring the system appropriately, so that the workload can be assumed by replica servers 106 and 108 responsive to a hard or soft failure within master server 104. All of the servers within server cluster 105 have access to persistent data storage maintained by a HA backend storage device 125. A transaction log 112 is provided within HA backend storage device 125 that enables failover events to be performed without losing data as a result of a failure in a master node such as master transaction server 104.

The large-scale storage media used to store data within HA backend storage 125 is typically many orders slower than local memory used to store transactional data within the individual server nodes within server cluster 105. Therefore, transaction data is often maintained on nodes within server cluster 105 until final results data must be copied to persistent storage within HA backend storage 125. If transaction log data is stored such as depicted in FIG. 1 within backend storage 125, the purpose of transaction in-memory storage is defeated. If, on the other hand, comprehensive transaction logs are not maintained, data integrity will be compromised when a master server failure results in the need to switch to a replica server.

It can therefore be appreciated that a need exists for a method, system, and computer program product for providing data consistency among multiple stored instances of data maintained in the middleware layer of an n-tier data handling and storage architecture. The present invention addresses this and other needs unresolved by the prior art.

SUMMARY OF THE INVENTION

A method and system for processing a transaction request in a distributed data handling architecture are disclosed herein. Responsive to receiving a transaction request at a master transaction server, a transaction identifier that identifies a data operation specified by the received transaction request is recorded within a local memory of the at least one replica server. Data resulting from the identified data operation is committed within local memory of the master transaction server and responsive to completion of committing the data within the master transaction server local memory, a post commit signal is sent to the at least one replica transaction server. Data resulting from the identified data operation is also committed within local memory of the at least one replica transaction server, and responsive to a failover condition that prevents the master transaction server from sending the post commit signal, the recorded transaction identifier is utilized to synchronize data stored locally within the at least one replica server within data stored within a persistent backend data store shared by the master transaction server and the at least one replica transaction server.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT(S)

The present invention is directed to memory management relating to failover in high availability client-server systems which may result in compromised data integrity. In particular, the present invention addresses data integrity issues arising when client transaction requests are handled by middleware transaction data replication nodes having shared access to persistent backend storage.

Figure 2:
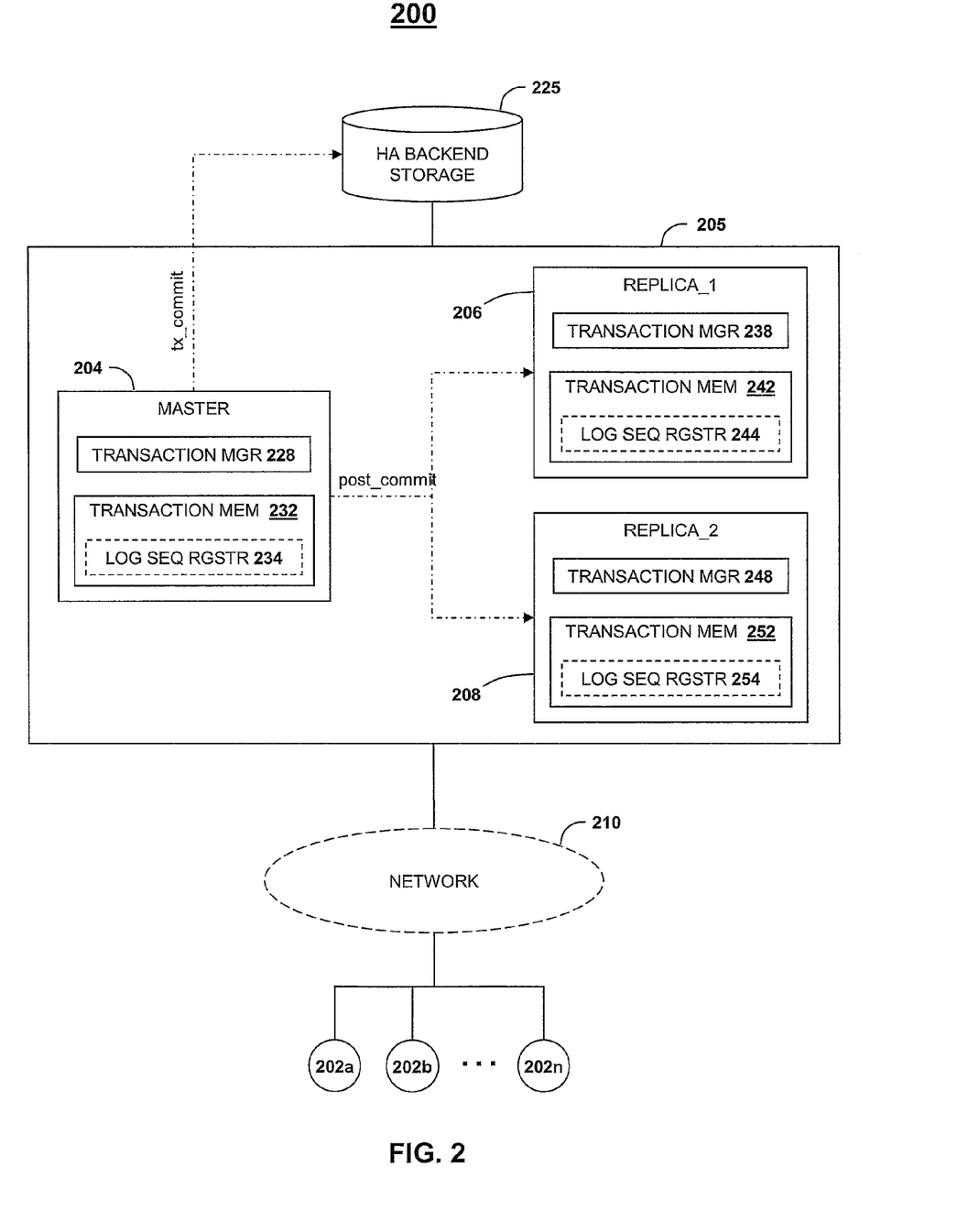
FIG. 2 is a high-level block diagram depicting a high availability server system adapted to implement failover replication data handling in accordance with the present invention.

FIG. 2 is a high-level block diagram depicting a high-availability (HA) server system 200 adapted to implement failover data handling in accordance with the present invention. As shown in FIG. 2, HA server system 200 generally comprises multiple client nodes 202a-202n communicatively coupled to a server cluster 205 via a network 210. In the depicted configuration, client nodes 202a-202n send data transaction requests to server cluster 205 via network 210. Server cluster 205 may be a proxy server cluster, web server cluster, or other server cluster that includes multiple, replication configured server nodes for handling high traffic demand. The replication configuration enables transaction requests from clients 202a-202n to be handled by server cluster 205 in a manner providing hardware and software redundancy.

In the depicted embodiment, server cluster 205 includes a master transaction server 204 and servers 206 and 208 configured as replicas of master server 204. In such a configuration, data updates, such as data modify and write operations are, by default, exclusively handled by master transaction server 204 to maintain data integrity and consistency between master transaction server 204 and a backend storage device 225. Redundancy and fault tolerance are provided by replica server nodes 206 and 208 which maintain copies of data transactions handled by and committed within master server 204.

HA server system 200 is configured as a three-tier data handling architecture in which server cluster 205 provides intermediate data handling and storage between client nodes 202a-202n and backend data storage device 225. Such network accessible data distribution results in a substantial portion of client request transaction data being maintained in the "middle" layer comprising server cluster 205 to provide faster access and alleviate the data access bottleneck that would otherwise arise from direct access to backend data storage device 225.

In a further aspect, the three-tier architecture of HA server system 200 implements synchronous transaction data replication among master server 204 and replica servers 206 and 208. In this manner, locally stored data (i.e. data stored on the local memory devices within the server) are replicated to replica servers 206 and 208 in a synchronous manner that avoids the need for a replication protocol between the master and replica servers. The synchronous data replication implemented with server cluster 205 provides redundancy and fault tolerance by detecting node or daemon failures and reconfiguring the system appropriately, so that the workload can be assumed by replica servers 206 and 208 responsive to a hard or soft failure within master server 204.

FIG. 2 further depicts functional features and mechanisms for processing transaction requests in the distributed data handling architecture implemented by HA server system 200. In one aspect, the invention provides a dynamically maintained distributed transaction log spread across one or more server nodes within server cluster 205. In the depicted embodiment, the distributed transaction log is embodied by transaction manager components contained within master server 204 and replica servers 206 and 208. Namely, master server 204 includes a transaction manager 228 and replica servers 206 and 208 include transaction managers 238 and 248, respectively, that process client transaction requests in a manner ensuring failover data integrity while avoiding the need to access a centralized transaction log within backend storage device 225 or to maintain excessive redundancy data.

Each of the transaction managers within the respective master and replica nodes manage transaction status data within locally maintained transaction memories. In the depicted embodiment, for example, transaction managers 228, 238, and 248 maintain log sequence register data 234, 244, and 254 maintained within local transaction memory spaces 232, 242, and 252, respectively. As illustrated and explained in further detail below with reference to FIGS. 5-7, the transaction managers generate and process transaction identifier data, such as in the form of data keys, in a manner enabling efficient failover handling without comprising data integrity.

Client transaction request processing is generally handled within HA server system 200 as follows. Client transaction requests are sent from client nodes 202a-202n to be processed by the master/replica server configuration implemented by server cluster 205. A transaction request may comprise a high-level client request such as, for example, a request to update bank account information which in turn may comprise multiple lower-level data processing requests such as various data reads, writes or modify commands required to accommodate the high-level request. As an example, client node 202a may send a high-level transaction request addressed to master server 204 requesting a deposit into a bank account having an account balance, ACCT_BAL1, prior to the deposit transaction. To satisfy the deposit request, the present account balance value, ACCT_BAL1, must be modified to a different amount, ACCT_BAL2, in accordance with the deposit amount specified by the deposit request. If the data for the bank account in question has been recently loaded and accessed, the present account balance value, ACCT_BAL1, may be stored in the local transaction memory 232 of master server 204 as well as the local memories 242 and 252 of replica servers 206 and 208 at the time the account balance modify transaction request is received. Otherwise, the account balance value, ACCT_BAL1, may have to be retrieved and copied from backend storage device 225 into the local memories of server nodes 204, 206, and 208.

The received deposit request is processed by master server 204 in a manner such that responsive to initially processing the request, master server 204 generates one or more data results to be locally committed to local transaction memory 232 as well as committed to the local transaction memories 242 and 252 of replica serves 206 and 208, respectively. To this end, transaction manager 248 issues the data to be committed as well as a transaction identifier to replica servers 206 and 208, which respond by storing the transaction identifier within log sequence registers 244 and 254 in the respective transaction memory spaces 242 and 252 and commencing commitment of the transaction data (i.e. modifying the stored ACCT_BAL1 value to the ACCT_BAL2 value).

Committing of the resultant data is performed in a synchronous manner such that committing the data within replica servers 206 and 208 is performed independently of committing the data within master server 204. Committing the data within replica servers 206 and 208 results in replication of the data generated by and stored within master server 204. Following such replication, master server 204 typically receives an acknowledgment (ACK) signal from replica servers 206 and 208 signaling successful replication of the modified account balance data. Following commitment of data within master server 204 and replica servers 206 and 208, master server 204 copies back the modified account balance data to backend storage device 225 using a transaction commit command, tx_commit, to ensure data consistency between the middleware storage and persistent backend storage.

Figure 3:
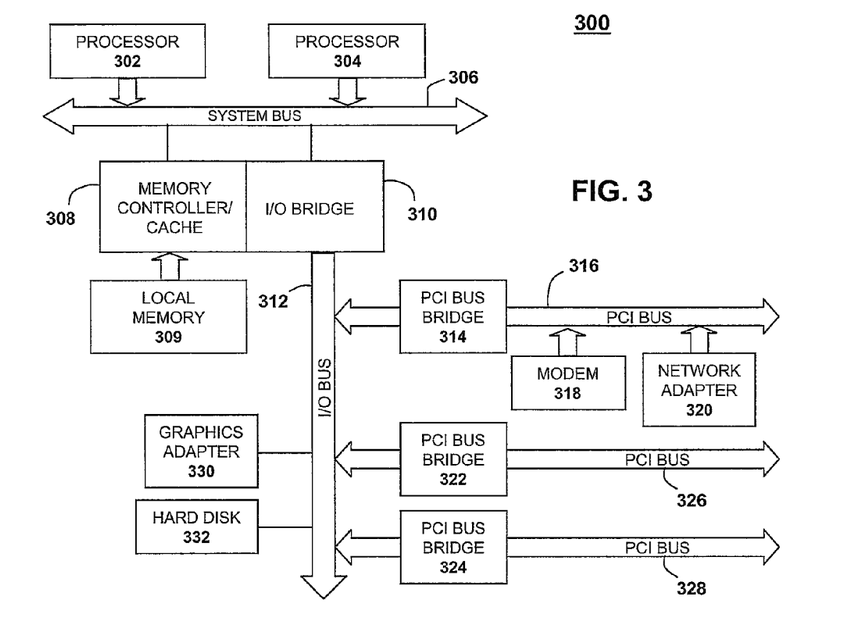
FIG. 3 is a block diagram depicting a data processing system that may be implemented as a server in accordance with a preferred embodiment of the present invention.

Referring to FIG. 3, there is illustrated a block diagram of a server system 300 that may be implemented as one or more of server nodes 204, 206, and 208 within server cluster 205 in FIG. 2, in accordance with the invention. Server system 300 may be a symmetric multiprocessor (SMP) system including a plurality of processors 302 and 304 connected to system bus 306. Alternatively, a single processor system may be employed. Also connected to system bus 306 is memory controller/cache 308, which provides an interface to local memory 309. I/O bus bridge 310 is connected to system bus 306 and provides an interface to I/O bus 312. Memory controller/cache 308 and I/O bus bridge 310 may be integrated as depicted.

A peripheral component interconnect (PCI) bus bridge 314 connected to I/O bus 312 provides an interface to PCI local bus 316. A number of modems may be connected to PCI local bus 316. Typical PCI bus implementations will support four PCI expansion slots or add-in connectors. Communications links to client nodes 202a-202n in FIG. 2 may be provided through modem 318 and network adapter 320 connected to PCI local bus 316 through add-in connectors.

Additional PCI bus bridges 322 and 324 provide interfaces for additional PCI local buses 326 and 328, from which additional modems or network adapters may be supported. In this manner, data processing system 300 allows connections to multiple network computers. A memory-mapped graphics adapter 330 and hard disk 332 may also be connected to I/O bus 312 as depicted, either directly or indirectly.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 3 may be, for example, an IBM eServer™ pSeries® system, a product of International Business Machines Corporation in Armonk, N.Y., running the Advanced Interactive Executive (AIX™) operating system or LINUX operating system.

Figure 4:
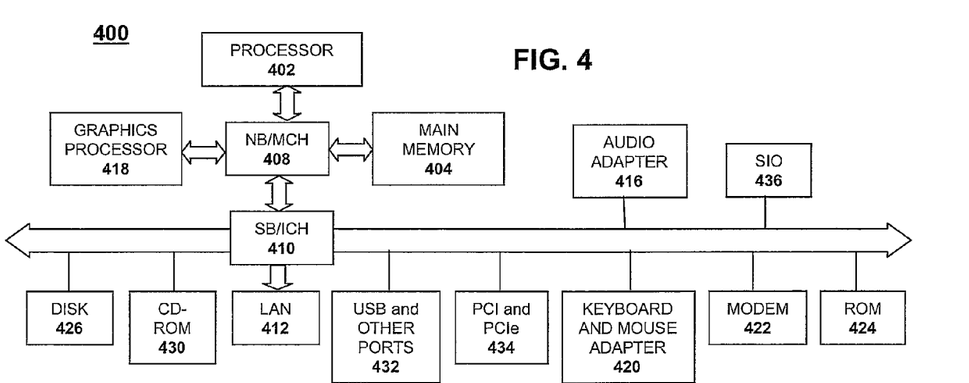
FIG. 4 is a block diagram illustrating a data processing system in which the present invention may be implemented.

With reference now to FIG. 4, a block diagram of a data processing system 400 is shown in which features of the present invention may be implemented. Data processing system 400 is an example of a computer, such a server node within server cluster 205 and/or one or more of client node 202a-202n in FIG. 2, in which code or instructions implementing the processes of the present invention may be stored and executed. In the depicted example, data processing system 400 employs a hub architecture including a north bridge and memory controller hub (MCH) 408 and a south bridge and input/output (I/O) controller hub (ICH) 410. Processor 402, main memory 404, and graphics processor 418 are connected to MCH 408. Graphics processor 418 may be connected to the MCH through an accelerated graphics port (AGP), for example.

In the depicted example, LAN adapter 412, audio adapter 416, keyboard and mouse adapter 420, modem 422, read only memory (ROM) 424, hard disk drive (HDD) 426, CD-ROM driver 430, universal serial bus (USB) ports and other communications ports 432, and PCI/PCIe devices 434 may be connected to ICH 410. PCI/PCIe devices may include, for example, Ethernet adapters, add-in cards, PC cards for notebook computers, etc. PCI uses a cardbus controller, while PCIe does not. ROM 424 may be, for example, a flash basic input/output system (BIOS). Hard disk drive 426 and CD-ROM drive 430 may use, for example, an integrated drive electronics (IDE) or serial advanced technology attachment (SATA) interface. A super I/O (SIO) device 436 may be connected to ICH 310.

An operating system runs on processor 402 and is used to coordinate and provide control of various components within data processing system 400. The operating system may be a commercially available operating system such as AIX®. An object oriented programming system, such as the Java® programming system, may run in conjunction with the operating system and provides calls to the operating system from Java® programs or applications executing on data processing system 400.

Instructions for the operating system, the object-oriented programming system, and applications or programs are located on storage devices, such as hard disk drive 426, and may be loaded into main memory 404 for execution by processor 402. The processes of the present invention may be performed by processor 402 using computer implemented instructions, which may be stored and loaded from a memory such as, for example, main memory 404, memory 424, or in one or more peripheral devices 426 and 430.

Those of ordinary skill in the art will appreciate that the hardware in FIG. 4 may vary depending on the implementation. Other internal hardware or peripheral devices, such as flash memory, equivalent non-volatile memory, or optical disk drives and the like, may be used in addition to or in place of the hardware depicted in FIG. 4. Also, the processes of the present invention may be applied to a multiprocessor data processing system such as that described with reference to FIG. 3.

Data processing system 400 may be a personal digital assistant (PDA), which is configured with flash memory to provide non-volatile memory for storing operating system files and/or user-generated data. The depicted example in FIG. 4 and above-described examples are not meant to imply architectural limitations. For example, data processing system 400 also may be a tablet computer, laptop computer, or telephone device in addition to taking the form of a PDA.

Figure 5:
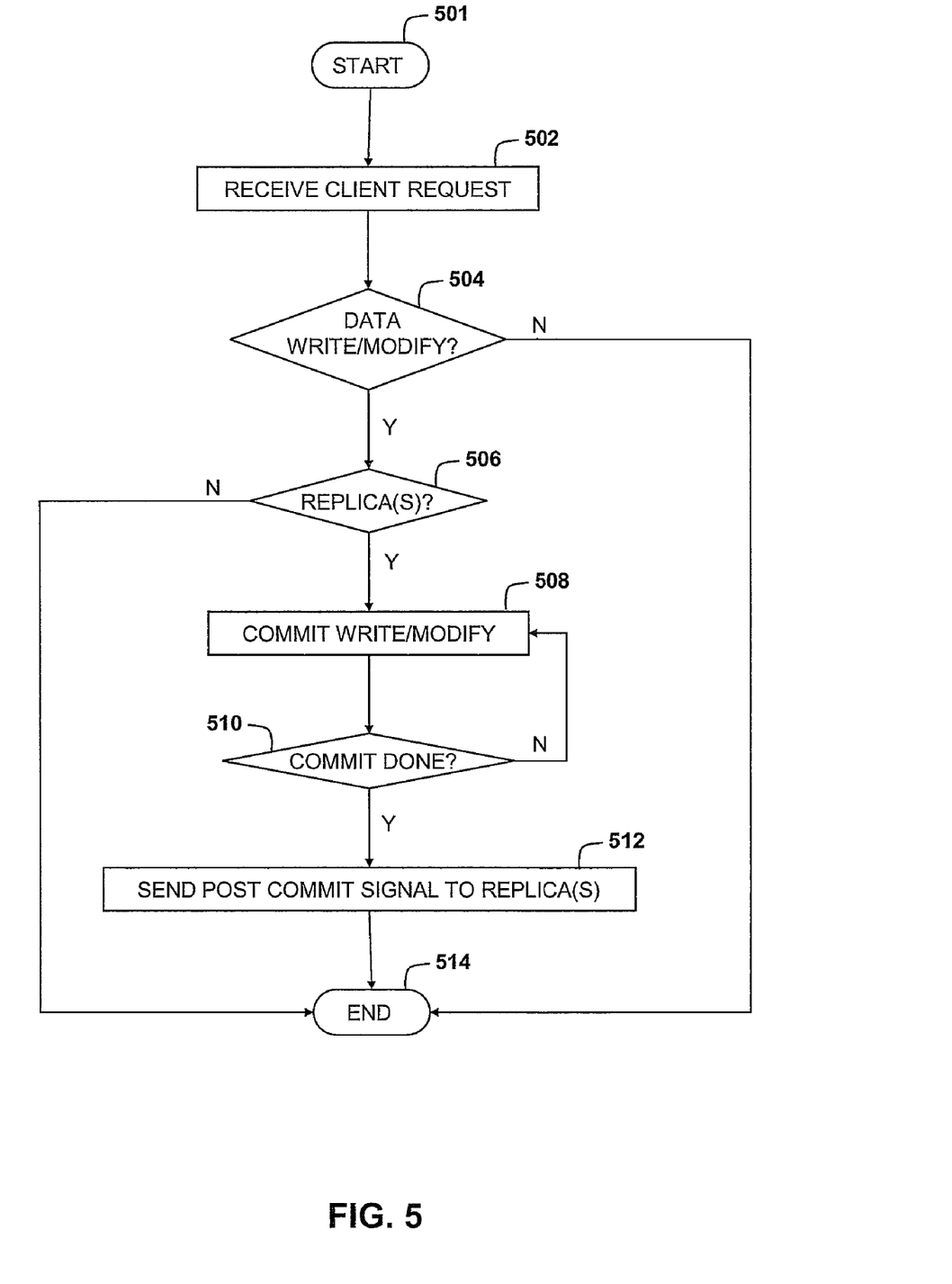
FIG. 5 is a high-level flow diagram illustrating master-side replication data handling in accordance with the present invention.

FIG. 5 is a high-level flow diagram illustrating master-side replication data handling such as may be implemented by master transaction server 204 within HA server system 200 in accordance with the present invention. The process begins as illustrated at steps 501 and 502 with master server 204 receiving a client request such as from one of client nodes 202a-

202n. In response to determining at step 504 that the client request does not require some modification or writing of data, such as for a read request, no replication data handling is necessary and the process ends as shown at step 514. The process also terminates without replication data handling if it is determined at step 504 that the client request is a data write and/or modify request and master server 204 is presently configured without replica servers (step 506).

If it is determined at step 504 that the client request is a data write and/or modify request and master server 204 is presently configured with replica servers, such as replica servers 206 and 208, (step 506), the process continues as shown at step 508 with the write/modify data being committed to local memory (i.e. a local memory device such as an onboard RAM device) within master server 204. As utilized herein, committing data refers to copying, writing, or otherwise storing the subject data within physical local memory of the server, in this case master server 204. Committing of the data to the local memory within master server 204 continues as shown at step 510 until the data commit is substantially complete. Responsive to determining that the data commit is substantially complete, master server 204 generates a post commit signal or message and sends the signal to presently configured replica servers 206 and 208 (step 512) at which point master-side replication transaction processing terminates as shown at step 514.

Figure 6:
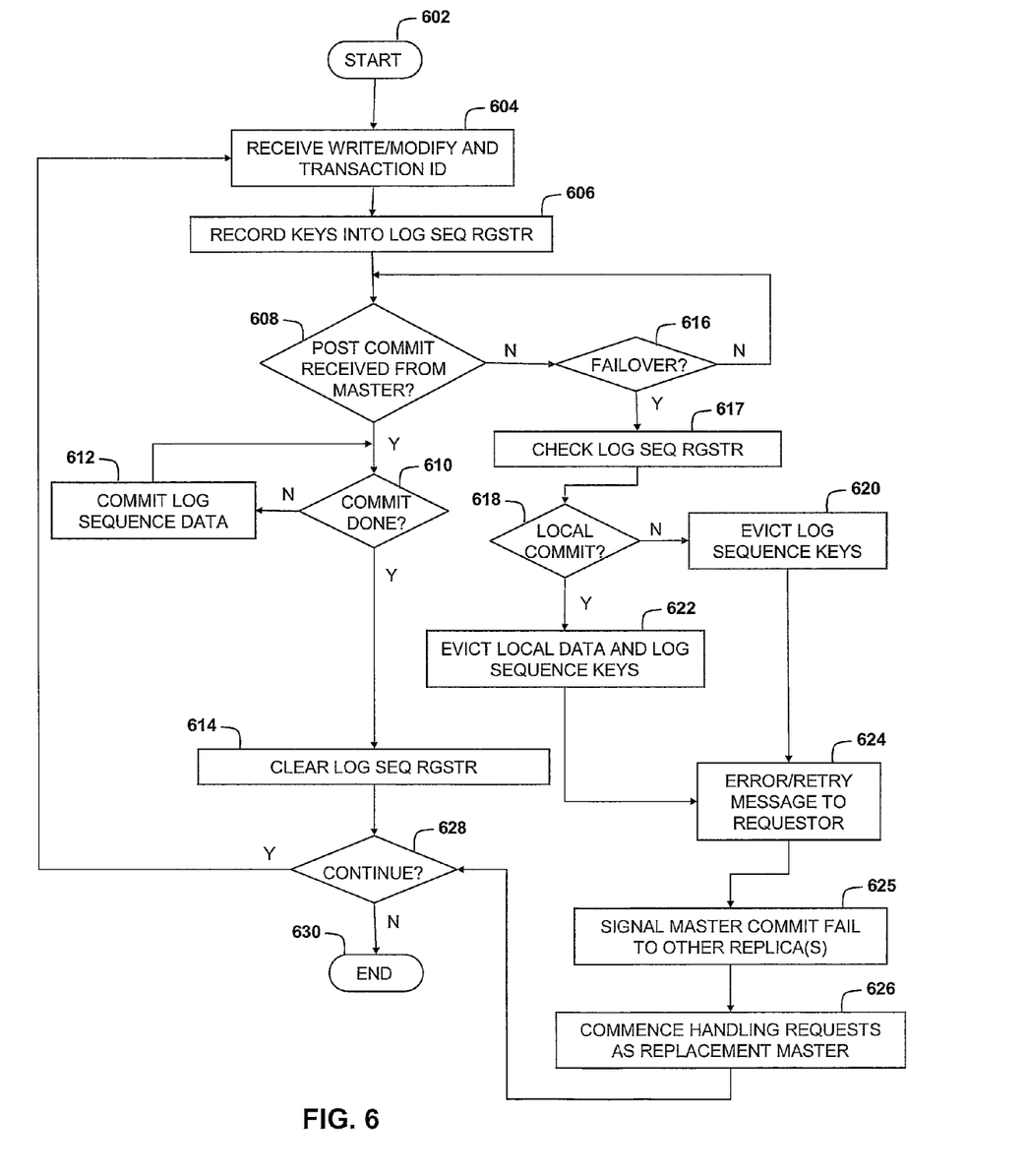
FIG. 6 is a high-level flow diagram illustrating replica-side replication and failover data handling in accordance with the present invention.

FIG. 6 is a high-level flow diagram illustrating replica-side failover handling such as may be performed by replica servers 206 and/or 208 in accordance with the present invention. The process begins as shown at steps 602 and 604 with one or both of replica servers 206 and/or 208 receiving a write/modify request and corresponding transaction identifier from master server 204. The write/modify request specifies data to be committed to local replica memories 242 and 252 and the transaction identifier specifies the one or more data operations required to commit the data to local memory. In one embodiment, the transaction identifier comprises one or more data keys, wherein each of the data keys corresponds to a specified data item specified by the transaction request received by master server 204. Responsive to receiving the write/modify request and transaction identifier from master server 204 and assuming the transaction identifier comprises data keys, the replica servers record within local memory (i.e., physical memory devices such as RAM devices within the replica servers) the data keys that identify the data operation(s) (write/modify in the depicted embodiment) specified by the transaction request (step 606). As depicted in FIG. 2, the transaction identifier data keys may be stored within log sequence registers 244 and 254.

In response to receiving the write/modify request, replica servers 206 and 208 commence committing the subject data to their respective local memories. Responsive to receiving a post commit signal from master server 204, the replica data may continue to be committed to replica server local memory until complete (steps 608, 610, and 612). Once the commitment of replica data locally within the replica servers is complete and in response to receiving a post commit signal indicating that the data has also been committed to the local memory within master server 204, the corresponding transaction identification entries (e.g. data keys) within the replica log sequence registers 244 and 254 are cleared and replica-side processing either continues with the next received request or terminates as shown at steps 614, 628, and 630.

As shown at steps 608 and 616, the replica servers wait for the post commit signal unless and until a failover event is detected and no post commit has been received. A failover event generally constitutes a failure that interrupts processing by master server 204 such as a physical or logical server failure, physical or logical network/connectivity failure, master server overload, etc. Responsive to detecting a failover prior, one of the replica servers is designated as the replacement master and proceeds with a failover sequence in which the transaction identifier keys stored in the log sequence register are utilized to maintain data consistency between the server cluster and backend data storage. Such sequence begins as shown at step 617 with the replacement master server checking its locally stored log sequence register to determine that an outstanding post commit has not been received from the failed master server. In response to such determination, the replacement master server determines whether the subject data specified by the log sequence register has been committed to its own local memory (step 618).

In accordance with the depicted embodiment, if the data has not been locally committed within the replacement master server memory, the log sequence keys corresponding to the committed data are evicted from the replacement master server's log sequence registers (step 620). If the data has been locally committed, the data operation(s) specified by the log sequence are reversed or undone such that modified data is restored to its previous value and written data is removed (step 622). In either case, the locally stored data within the new master now conforms to data within backend storage and an error/retry message is delivered from the new master server to the client requester so that the transaction request can be handled by the new master (step 624).

Following the data transaction failover handling sequence, the new master server signals the master commit failure and transaction status to the other replica servers (step 625) and the new master commences handling client requests (step 626) using the procedure illustrated and described with reference to FIG. 5.

Figure 7:
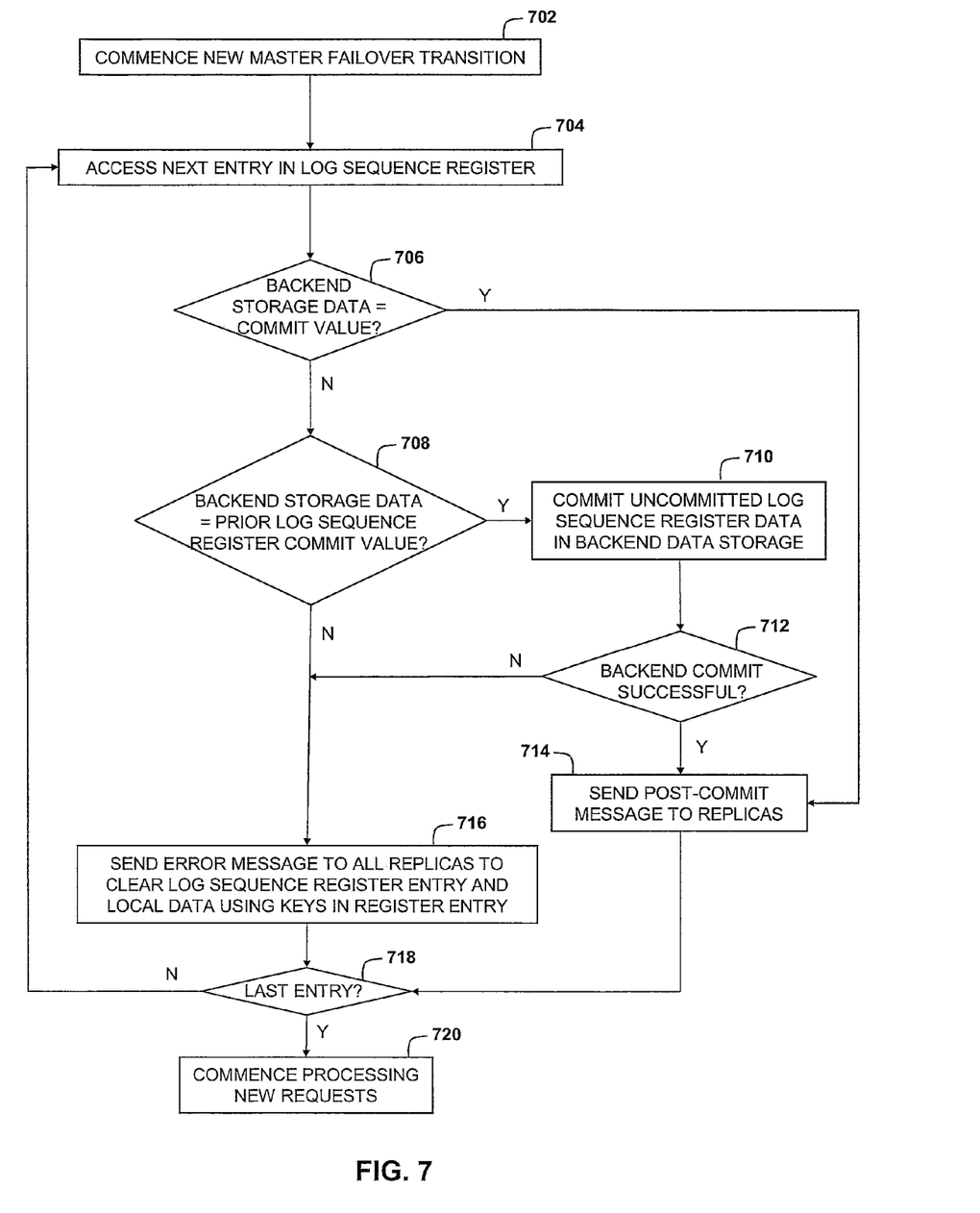
FIG. 7 is a high-level flow diagram depicting steps performed by the replacement master server during a failover cycle in accordance with an alternate embodiment of the present invention.

The embodiment illustrated in FIG. 6 does not account for variations in whether or to what extent the backend data storage device commits the data results pending per the stored keys in the log sequence registers that were never cleared using the post commit signal from the failed master. With reference now to FIG. 7, there is depicted a high-level flow diagram illustrating steps performed by the replica server transitioning to become the replacement master in accordance with an alternate embodiment. For the embodiment shown in FIG. 7, the replacement master compares backend data storage status with its locally stored log sequence register entries to synchronize the data stored in the replacement master and backend data storage. Specifically, the process begins as shown at steps 702 and 704 with the pre-designated or otherwise selected replacement master server responding to the failover transition by accessing a next entry in its locally stored log sequence register.

Responsive to comparing data in the backend storage with the locally committed data and determining that the backend storage device contains the data corresponding to the locally committed entry (i.e., the backend data storage has already committed the written/modified data specified by the log sequence register entry), the replacement master sends a post-commit message to each of the replica servers (step 714). The post-commit message indicates that the data corresponding to the register entry in question (e.g., one or more data keys in register) has been committed and instructs the replicas to locally commit and clear the entries as previously depicted and described in FIG. 6.

Responsive to determining at the comparison shown at step 706 that the backend storage device does not contain the data corresponding to the locally committed entry, a further inquiry shown at step 708, is utilized to determine whether data corresponding to a previous entry in the log sequence register has been committed within the backend data storage. Responsive to neither the data corresponding to the present log sequence register entry nor data corresponding to the previous entry being committed within the backend data storage, the replacement master sends an error message to the replica servers (step 716). The error message instructs the recipient replica servers to clear both the log sequence entry in question (e.g., clear the data key) and the corresponding locally committed data. Next, the replacement master server continues with the next log sequence register entry (steps 718 and 704) unless the end of the log sequence register has been reached.

If it is determined at step 708 that the data corresponding to the prior log sequence register entry has been committed to the backend storage device, the replacement master server instructs the backend server to commit the uncommitted data corresponding to the presently accessed log sequence register entry (step 710). As illustrated at steps 712 and 714, responsive to successfully committing the uncommitted data corresponding to the presently accessed log sequence register entry in the backend data storage, the replacement master sends post-commit signals that instruct the replica servers to clear the corresponding log sequence register entries. Otherwise, the process continues as shown at step 716 with the replacement master sending the previously described error message to the replica servers.

The disclosed methods may be readily implemented in software using object or object-oriented software development environments that provide portable source code that can be used on a variety of computer or workstation hardware platforms. In this instance, the methods and systems of the invention can be implemented as a routine embedded on a personal computer such as a Java or CGI script, as a resource residing on a server or graphics workstation, as a routine embedded in a dedicated source code editor management system, or the like.

While the invention has been particularly shown and described with reference to a preferred embodiment, it will be understood by those skilled in the art that various changes in form and detail may be made therein without departing from the spirit and scope of the invention. These alternate implementations all fall within the scope of the invention.

What is claimed is:

1. A method for processing a transaction request in a distributed data handling architecture, said method comprising: responsive to receiving a transaction request at a master transaction server, recording within a local memory of at least one replica transaction server a transaction identifier that identifies a data operation specified by the received transaction request; committing data resulting from the identified data operation within local memory of the master transaction server; responsive to completing said committing data within the master transaction server local memory, sending a post commit signal to the at least one replica transaction server; committing data resulting from the identified data operation within local memory of the at least one replica transaction server; and responsive to a failover condition that prevents the master transaction server from sending the post commit signal, utilizing the recorded transaction identifier to synchronize data stored locally within the at least one replica transaction server with data stored within a persistent backend data store shared by the master transaction server and the at least one replica transaction server.

2. The method of claim 1, further comprising, responsive to the at least one replica transaction server receiving the post commit signal:

determining whether data resulting from the identified data operation has been committed to local memory within the at least one replica transaction server; and responsive to determining that data resulting from the identified data operation has been committed to local memory within the at least one replica transaction server, clearing the transaction identifier from the local memory of the at least one replica transaction server.

3. The method of claim 1, wherein the transaction identifier is recorded in a log sequence register, said method further comprising, in response to the failover condition, checking the log sequence register to determine whether the transaction identifier has been cleared.

4. The method of claim 1, wherein the transaction identifier is recorded in a log sequence register, said method further comprising, in response to the failover condition:

accessing an entry in the log sequence register; and determining whether data corresponding to the accessed log sequence register entry is committed within the backend storage device.

5. The method of claim 4, further comprising:

responsive to determining that data corresponding to the accessed log sequence register entry is not committed within the backend storage device, determining whether data corresponding to a previous log sequence register entry is committed with the backend data storage device; and responsive to data corresponding to a previous log sequence register entry being committed within the backend data storage device, instructing the backend storage device to commit the data corresponding to the accessed log sequence register entry.

6. The method of claim 5, further comprising in response to successful commitment within the backend data storage device of the data corresponding to the accessed log sequence register entry, sending a post commit signal to one or more replica transaction servers.

7. The method of claim 5, further comprising in response to determining that data corresponding to the accessed log sequence register entry is not committed within the backend storage device and further in response to responsive to data corresponding to a previous log sequence register entry not being committed with the backend data storage device, sending an error message to one or more replica transaction servers wherein said error message instructs the replica transaction servers to clear local log sequence register entries corresponding to the accessed log sequence register entry.

8. A system for processing a transaction request in a distributed data handling architecture, said system comprising: a transaction manager within a master transaction server that: responsive to the master transaction server receiving a transaction request, commits data resulting from the identified data operation within local memory of the master transaction server; and responsive to completing said committing data within the master transaction server local memory, sending a post commit signal to a replica transaction server; a transaction manager within the replica transaction server that: records within a local memory of the replica transaction server a transaction identifier that identifies a data operation specified by the received transaction request; commits data resulting from the identified data operation within local memory of the replica transaction server; and responsive to a failover condition that prevents the master transaction server from sending the post commit signal, utilizes the recorded transaction identifier to synchronize data stored locally within the replica transaction server with data stored within a persistent backend data store shared by the master transaction server and the replica transaction server.

9. The system of claim 8, further comprising, means responsive to the at least one replica transaction server receiving the post commit signal for:
   determining whether data resulting from the identified data operation has been committed to local memory within the at least one replica transaction server; and
   responsive to determining that data resulting from the identified data operation has been committed to local memory within the at least one replica transaction server, clearing the transaction identifier from the local memory of the at least one replica transaction server.

10. The system of claim 8, wherein the transaction identifier is recorded in a log sequence register, said system further comprising, means responsive to the failover condition for checking the log sequence register to determine whether the transaction identifier has been cleared.

11. The system of claim 8, wherein the transaction identifier is recorded in a log sequence register, said system further comprising:
   a replica transaction server designated to be the replacement master transaction server in response to the failover condition;
   said replacement master transaction server:
     accessing an entry in the log sequence register; and
     determining whether data corresponding to the accessed log sequence register entry is committed within the backend storage device.

12. The system of claim 11, wherein responsive to determining that data corresponding to the accessed log sequence register entry is not committed within the backend storage device, said replacement master transaction server determines whether data corresponding to a previous log sequence register entry is committed with the backend data storage device, and responsive to determining that data corresponding to a previous log sequence register entry is committed within the backend data storage device, said replacement master transaction server instructs the backend storage device to commit the data corresponding to the accessed log sequence register entry.

13. The system of claim 12, further comprising in response to successful commitment within the backend data storage device of the data corresponding to the accessed log sequence register entry, said replacement master transaction server sends a post commit signal to one or more replica transaction servers.

14. The system of claim 12, further comprising in response to determining that data corresponding to the accessed log sequence register entry is not committed within the backend storage device and further in response to responsive to data corresponding to a previous log sequence register entry not being committed with the backend data storage device, said replacement master transaction server sends an error message to one or more replica transaction servers wherein said error message instructs the replica transaction servers to clear local log sequence register entries corresponding to the accessed log sequence register entry.

15. A tangible computer-readable medium having encoded thereon computer-executable instructions for processing a transaction request in a distributed data handling architecture, said computer-executable instructions adapted for performing a method comprising: responsive to receiving a transaction request at a master transaction server, recording within a local memory of at least one replica transaction server a transaction identifier that identifies a data operation specified by the received transaction request; committing data resulting from the identified data operation within local memory of the master transaction server; responsive to completing said committing data within the master transaction server local memory, sending a post commit signal to the at least one replica transaction server; committing data resulting from the identified data operation within local memory of the at least one replica transaction server; and responsive to a failover condition that prevents the master transaction server from sending the post commit signal, utilizing the recorded transaction identifier to synchronize data stored locally within the at least one replica transaction server with data stored within a persistent backend data store shared by the master transaction server and the at least one replica transaction server.

16. The tangible computer-readable medium of claim 15, wherein said method further comprises, responsive to the at least one replica transaction server receiving the post commit signal:
   determining whether data resulting from the identified data operation has been committed to local memory within the at least one replica transaction server; and
   responsive to determining that data resulting from the identified data operation has been committed to local memory within the at least one replica transaction server, clearing the transaction identifier from the local memory of the at least one replica transaction server.

17. The tangible computer-readable medium of claim 15, wherein the transaction identifier is recorded in a log sequence register, said method further comprising, in response to the failover condition:
   accessing an entry in the log sequence register; and
   determining whether data corresponding to the accessed log sequence register entry is committed within the backend storage device.

18. The tangible computer-readable medium of claim 17, said method further comprising:
   responsive to determining that data corresponding to the accessed log sequence register entry is not committed within the backend storage device, determining whether data corresponding to a previous log sequence register entry is committed with the backend data storage device; and
   responsive to data corresponding to a previous log sequence register entry being committed within the backend data storage device, instructing the backend storage device to commit the data corresponding to the accessed log sequence register entry.

19. The tangible computer-readable medium of claim 18, said method further comprising in response to successful commitment within the backend data storage device of the data corresponding to the accessed log sequence register entry, sending a post commit signal to one or more replica transaction servers.

20. The tangible computer-readable medium of claim 18, said method further comprising in response to determining that data corresponding to the accessed log sequence register entry is not committed within the backend storage device and further in response to responsive to data corresponding to a previous log sequence register entry not being committed with the backend data storage device, sending an error message to one or more replica transaction servers wherein said error message instructs the replica transaction servers to clear local log sequence register entries corresponding to the accessed log sequence register entry.

* * * * *